(12) United States Patent
Wang et al.

(10) Patent No.: US 12,025,531 B2
(45) Date of Patent: Jul. 2, 2024

(54) RAPID DETECTION TOOL FOR COAXIAL RELATIONSHIP BASED ON PHOTOSENSITIVE MATERIAL AND DETECTION METHOD USING SAME

(71) Applicant: JIANGSU UNIVERSITY, Zhenjiang (CN)

(72) Inventors: Yun Wang, Zhenjiang (CN); Lihui Ren, Zhenjiang (CN); Fuzhu Li, Zhenjiang (CN); Zhenying Xu, Zhenjiang (CN); Kun Zhang, Zhenjiang (CN); Wang Ni, Zhenjiang (CN); Ying Yan, Zhenjiang (CN); Weili Liu, Zhenjiang (CN); Peiyu He, Zhenjiang (CN); Xu Ding, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/787,346

(22) PCT Filed: Feb. 25, 2022

(86) PCT No.: PCT/CN2022/077960
§ 371 (c)(1),
(2) Date: Jun. 15, 2023

(87) PCT Pub. No.: WO2023/103186
PCT Pub. Date: Jun. 15, 2023

(65) Prior Publication Data
US 2024/0183747 A1 Jun. 6, 2024

(30) Foreign Application Priority Data

Dec. 10, 2021 (CN) .......................... 202111504198.3

(51) Int. Cl.
*G01M 13/00* (2019.01)
*G06T 7/00* (2017.01)
(Continued)

(52) U.S. Cl.
CPC ........... *G01M 13/00* (2013.01); *G06T 7/0004* (2013.01); *G06T 7/60* (2013.01); *H04N 23/90* (2023.01); *G06T 2207/30164* (2013.01)

(58) Field of Classification Search
CPC ....... B24B 37/345; F21V 23/00; G01K 13/00; G01N 21/01; G01N 21/85
(Continued)

(56) References Cited

U.S. PATENT DOCUMENTS

2021/0379708 A1* 12/2021 He .......................... B25J 19/023

FOREIGN PATENT DOCUMENTS

CN 104316001 A * 1/2015
CN 104316001 A 1/2015
(Continued)

*Primary Examiner* — Masum Billah
(74) *Attorney, Agent, or Firm* — Bayramoglu Law Offices LLC

(57) ABSTRACT

A rapid detection tool for a coaxial relationship based on a photosensitive material and a detection method using the same are used to detect coaxiality of two through-holes in the same workpiece to be detected. An image processing unit and a control unit are mounted outside a light-shielding box. Light sources, cameras, sensors, and an air cylinder are mounted in the light-shielding box. A photosensitive plate coated with a photosensitive resin is placed between the two holes, and two sides are irradiated by the light sources. Coordinates of centers of circular patterns formed on the photosensitive plate are calculated so that a coaxial relationship between the two holes can be accurately obtained. An (Continued)

output rod of the air cylinder is controlled to extend outward to reject a workpiece to be detected not meeting requirements.

9 Claims, 5 Drawing Sheets

(51) Int. Cl.
    *G06T 7/60*     (2017.01)
    *H04N 23/90*     (2023.01)

(58) Field of Classification Search
    USPC .......................................................... 348/92
    See application file for complete search history.

(56) References Cited

FOREIGN PATENT DOCUMENTS

| | | | | | |
|---|---|---|---|---|---|
| CN | 108772311 | A | * | 11/2018 | |
| CN | 109919919 | A | | 6/2019 | |
| CN | 110470247 | A | | 11/2019 | |
| CN | 210847252 | U | * | 6/2020 | |
| CN | 210847252 | U | | 6/2020 | |
| CN | 112710216 | A | | 4/2021 | |
| JP | 2001194133 | A | | 7/2001 | |
| KR | 2008111653 | A | * | 12/2008 | |
| KR | 1443985 | B1 | * | 11/2014 | ........... H01L 23/053 |

\* cited by examiner

RAPID DETECTION TOOL FOR COAXIAL RELATIONSHIP BASED ON PHOTOSENSITIVE MATERIAL AND DETECTION METHOD USING SAME

CROSS REFERENCE TO RELATED APPLICATIONS

This application is the national phase entry of International Application No. PCT/CN2022/077960, filed on Feb. 25, 2022, which is based upon and claims priority to Chinese Patent Application No. 202111504198.3, filed on Dec. 10, 2021, the entire contents of which are incorporated herein by reference.

TECHNICAL FIELD

The present invention belongs to the technical field of detection, and relates to a detection tool for a coaxial relationship, which is used to detect the coaxiality of two through-holes in the same workpiece to be detected.

BACKGROUND

Coaxiality refers to a maximum allowable variation of a central axis of a measured actual hole with respect to a reference axis, which is reflected as inconcentricity of circles in cross section. Holes having a coaxial relationship and relevant assembly are often involved in the operation and installation process of various precise parts, and the coaxial relationship has a great influence on the quality of the product and project, working efficiency, and service life. In the case of excessive coaxiality deviation between axial holes, parts with axial hole fit are deformed, get stuck, or even the parts are broken under high-speed operation conditions; moreover, friction in the transmission process is increased, thereby affecting the use and service life of the parts and increasing the vibration noise of the entire machine.

A conventional coaxial relationship detection method entails fabricating a standard detection pin shaft and using it together with a dialgauge for detection. The positioning reference needs to be changed many times during detection of the coaxial relationship, resulting in large positioning errors; moreover, due to different hole diameters, different workpieces require special detection pin shafts, resulting in a narrow scope of application. Meanwhile, the dialgauge is manually operated and read by a measuring person, causing low efficiency and large measurement errors. Besides, if the hole diameter is too small, it is difficult to detect the coaxial relationship.

SUMMARY

The objective of the present invention is, in order to solve the existing problem in coaxial relationship detection, to provide a rapid detection tool for a coaxial relationship based on a photosensitive material and a detection method using the same, which can efficiently, automatically, and accurately detect a coaxial relationship of a workpiece.

In order to achieve the aforementioned objective, a rapid detection tool for a coaxial relationship based on a photosensitive material in the present invention adopts the following technical solution: a top plate of a light-shielding box is provided with an entrance, a bottom plate of the light-shielding box is provided with a first exit, and a left side plate of the light-shielding box is provided with a second exit, a defective product warehouse is placed on a lower left side outside the light-shielding box, the defective product warehouse is placed right below the second exit on the left side plate, and a quality product warehouse is placed right below the first exit on the bottom plate; a first conveyor belt and a second conveyor belt parallel to each other and respectively arranged left and right at an interval are disposed in the light-shielding box, an output shaft of a first servo motor horizontally arranged in a front-rear direction is coaxially and fixedly connected to a first conveyor belt driving shaft, a lower end of the first conveyor belt is wound on the first conveyor belt driving shaft, and an upper end of the first conveyor belt is wound on a first conveyor belt driven shaft; an output shaft of a second servo motor horizontally arranged in the front-rear direction is coaxially and fixedly connected to a second conveyor belt driving shaft, a lower end of the second conveyor belt is wound on the second conveyor belt driving shaft, and an upper end of the second conveyor belt is wound on a second conveyor belt driven shaft; a photosensitive plate is fixedly and circumferentially connected right in a middle of an outer surface of the second conveyor belt, and the photosensitive plate is perpendicular to the outer surface of the second conveyor belt; a plurality of support plates each in a U-shape for supporting a workpiece to be detected are fixedly and circumferentially connected at equal intervals on an outer surface of the first conveyor belt, two side plates of the U-shape are arranged in the front-rear direction, each of the support plates is perpendicular to the outer surface of the first conveyor belt, two axial holes of the workpiece to be detected are respectively located on the two side plates of the U-shape of each of the support plates, the photosensitive plate extends rightward to a position right in a middle of an opening of the U-shape and covers the two axial holes, and distances between the two axial holes and the photosensitive plate in the front-rear direction are equal; a common through-hole is provided at a bottom of the U-shape of each of the support plates and a connection part between the bottom of the U-shape of each of the support plates and the first conveyor belt, an air cylinder is disposed at an identical height as the second exit on the left side plate, and an output rod of the air cylinder is oriented toward the second exit on the left side plate; a first light source is arranged on a front side plate inside the light-shielding box, a first camera is disposed right above the first light source, a second camera and a second light source are disposed on a rear side plate on the inner side of the light-shielding box, the first light source and the second light source are symmetrical with respect to the photosensitive plate in the front-rear direction, and the first camera and the second camera are symmetrical with respect to the photosensitive plate in the front-rear direction; a first position sensor is disposed at an identical height as the first light source and the second light source, and a second position sensor is disposed at the second exit on the left side plate; the first camera and the second camera are each connected to an image processing unit through a signal line, an output end of the image processing unit is connected to a control unit through a signal line, and the first servo motor, the second servo motor, the air cylinder, the first position sensor, the second position sensor, the first light source, and the second light source are each connected to the control unit through a corresponding signal line or control line.

A detection method using the rapid detection tool for the coaxial relationship based on the photosensitive material adopts a technical solution including the following steps:

step A: controlling, by the control unit, the first servo motor and the second servo motor to simultaneously work, so that the first conveyor belt and the second conveyor belt have opposite moving directions, the support plates move with the first conveyor belt, and the photosensitive plate moves with the second conveyor belt;

step B: placing, from the entrance, a workpiece to be detected on a support plate of the support plates on an uppermost end, driving, by the first conveyor belt, the workpiece to be detected close to a side of the photosensitive plate to move downward, and when the first position sensor detects that two axial holes of the workpiece to be detected are at an identical height as the first light source and the second light source, controlling, by the control unit, the first servo motor and the second servo motor to stop working;

step C: controlling, by the control unit, the first light source to irradiate a front axial hole of the two axial holes from a front side of the workpiece to be detected, and the second light source to irradiate a rear axial hole of the two axial holes from a rear side of the workpiece to be detected, so as to form a first circular pattern on a front surface of the photosensitive plate and a second circular pattern on a rear surface of the photosensitive plate;

step D: controlling, by the control unit, the first camera to photograph the first circular pattern on the front surface of the photosensitive plate, and the second camera to photograph the second circular pattern on the rear surface of the photosensitive plate, and calculating, by the image processing unit, coordinates of centers of the first circular pattern and the second circular pattern, and judging whether a coaxial relationship between the first circular pattern and the second circular pattern meets tolerance requirements; and step E: controlling, by the control unit, the first servo motor and the second servo motor to work again, when the control unit judges that the coaxial relationship does not meet the tolerance requirements, and the second position sensor detects that the workpiece to be detected moves to an identical height as the second exit on the left side plate of the light-shielding box, the first servo motor and the second servo motor stopping working, and controlling, by the control unit, the output rod of the air cylinder to pass leftward through the common through-hole and then push the workpiece to be detected into the defective product warehouse; on the contrary, when the coaxial relationship meets the tolerance requirements, and the support plate on which the workpiece to be detected is placed rotates to a vertical state, the workpiece to be detected falling from the first exit on the bottom plate into the quality product warehouse under gravity.

As compared with the prior art, the present invention has the following beneficial effects:

The detection tool of the present invention uses the principle that a photosensitive resin immediately produces a polymerization reaction under irradiation of a light source, a photosensitive plate coated with a photosensitive resin is placed between two holes, two sides are irradiated by light sources, and coordinates of centers of circular patterns formed on the photosensitive plate are calculated, so that a coaxial relationship between the two holes can be accurately obtained, thereby greatly improving detection efficiency and detection precision.

The detection tool of the present invention has a wide scope of application, is applicable to detection of a coaxial relationship between two opposite through-holes of various workpieces to be detected, and has strong practicability in actual use.

In the detection tool of the present invention, an image processing unit and a control unit are mounted outside a light-shielding box, light sources, cameras, sensors, and an air cylinder are mounted in the light-shielding box, the control unit controls the air cylinder to start working according to data of a coaxial relationship of a workpiece to be detected that is fed back by the image processing unit, and an output rod of the air cylinder extends outward to reject a workpiece to be detected having a coaxial relationship not meeting requirements, so that the detection method has a high degree of automation, the whole process from a workpiece to be detected entering the light-shielding box, detecting the workpiece to be detected, to rejecting a defective product can be automatically completed, so as to realize rapid detection of a coaxial relationship of the workpiece to be detected, improve detection efficiency, reduce the labor intensity of an operator, and reduce operating errors.

BRIEF DESCRIPTION OF THE DRAWINGS

The present invention is further illustrated in detail below with reference to the accompanying drawings and specific embodiments.

In the figures: 1—light-shielding box; 2—magnet; 3—first servo motor; 4—first servo motor mounting plate; 5—iron; 6—second servo motor mounting plate; 7—second servo motor; 8—first light-shielding cloth; 9—second conveyor belt driven shaft; 10—photosensitive plate; 11—second conveyor belt; 12—second conveyor belt driving shaft; 13—second light-shielding cloth; 14—defective product warehouse; 15—quality product warehouse; 16—third light-shielding cloth; 17—first conveyor belt driving shaft; 18—air cylinder mounting plate; 19—air cylinder; 20—support plate; 21—first conveyor belt; 22—first conveyor belt driven shaft; 23—workpiece to be detected; 24—second camera; 25—first camera; 26—second light source; 27—first light source; 28—first position sensor; 29—second position sensor; 30—image processing unit; 31—control unit; 801—front single body of first light-shielding cloth; 802—rear single body of first light-shielding cloth; 1301—upper single body of second light-shielding cloth; 1302—lower single body of second light-shielding cloth; 2301—rear straight plate; 2302—front straight plate; 2303—rear axial hole; 2304—front axial hole.

DETAILED DESCRIPTION OF THE EMBODIMENTS

Figure 1:
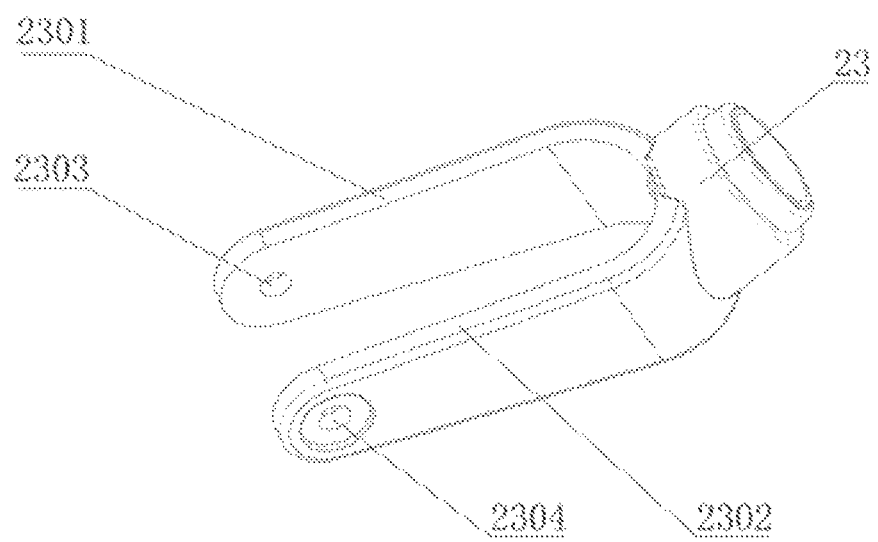
FIG. 1 is a three-dimensional view of a workpiece to be detected.

Referring to FIG. 1, a normal workpiece 23 to be detected has an overall structure in a U-shape, and FIG. 1 uses a fork as an example of the workpiece 23 to be detected for description. A rear side plate 2301 and a front side plate 2302 of the U-shape of the workpiece 23 to be detected are parallel to each other, the rear side plate 2301 and the front side plate 2302 are each provided with an axial hole, which are respectively a rear axial hole 2303 and a front axial hole 2304. The present invention aims to detect coaxiality of the rear axial hole 2303 and the front axial hole 2304.

Referring to FIG. 2, FIG. 3, FIG. 4, and FIG. 5, a rapid detection tool for a coaxial relationship based on a photosensitive material in the present invention has a light-shielding box 1, where a darkroom is inside the light-shielding box 1. A defective product warehouse 14 is placed on a lower left side outside the light-shielding box 1, a quality product warehouse 15 is placed on a lower side outside the light-shielding box 1, a workpiece 23 to be detected that is qualified in the detection falls from the light-shielding box 1 and then enters the quality product warehouse 15, and a workpiece 23 to be detected that is unqualified in the detection is pushed out of the light-shielding box 1 and then falls into the defective product warehouse 14.

A top plate of a light-shielding box 1 is provided with an entrance, a bottom plate of the light-shielding box 1 is provided with a first exit, and a left side plate of the light-shielding box 1 is provided with a second exit, and a light-shielding cloth is used at each of the entrance, the first exit, and the second exit to block light. The quality product warehouse 15 is placed right below the first exit on the bottom plate, and the defective product warehouse 14 is placed right below the second exit on the left side plate. The light-shielding cloth is divided in the middle into two pieces, one piece has magnets 2 mounted thereon, and the other piece has iron blocks 5 mounted thereon. When the light-shielding cloth covers the entrance or each of the first exit and the second exit, the magnets 2 and the iron blocks 5 attract each other so that the light-shielding cloth blocks light, and when the entrance, the first exit, and the second exit each are opened, the magnets 2 are temporarily separated from the iron blocks 5. Specifically, a first light-shielding cloth 8 is connected to the entrance, and the first light-shielding cloth 8 is divided into a front single body 801 of the first light-shielding cloth and a rear single body 802 of the first light-shielding cloth fixedly connected to the light-shielding box 1. A second light-shielding cloth 13 is connected to the second exit on the left side plate, and the second light-shielding cloth 13 is divided into an upper single body 1301 of the second light-shielding cloth and a lower single body 1302 of the second light-shielding cloth fixedly connected to the light-shielding box 1. A plurality of magnets 2 are fixed to a side edge of the front single body 801 of the first light-shielding cloth and a side edge of the upper single body 1301 of the second light-shielding cloth, and a plurality of iron blocks 5 are fixed to a side edge of the rear single body 802 of the first light-shielding cloth and a side edge of the lower single body 1302 of the second light-shielding cloth. A third light-shielding cloth 16 is disposed at the first exit on the bottom plate, and the structure of the third light-shielding cloth 16 is the same as the structure of the first light-shielding cloth 8.

When the workpiece 23 to be detected is put into the light-shielding box 1 through the entrance on the top, the left single body 801 of the first light-shielding cloth is manually separated from the right single body 802 of the first light-shielding cloth, and after the workpiece 23 to be detected is put in, the magnets 2 and the iron blocks 5 on the first light-shielding cloth 8 attract each other, so that the side edge of the front single body 801 of the first light-shielding cloth and the side edge of the rear single body 802 of the first light-shielding cloth contact each other, making the entrance at the top of the light-shielding box 1 restore the closed state. When a workpiece 23 to be detected having a coaxial relationship not meeting requirements passes through the second exit on the left side plate, the upper single body 1301 of the second light-shielding cloth and the lower single body 1302 of the second light-shielding cloth are separated for the workpiece 23 to be detected to pass, and then the magnets 2 and the iron blocks 5 on the second light-shielding cloth 13 attract each other, so that the side edge of the upper single body 1301 of the second light-shielding cloth and the side edge of the lower single body 1302 of the second light-shielding cloth contact each other, making the second exit on the left side plate restore the closed state. Similarly, after a workpiece 23 to be detected having a coaxial relationship meeting requirements passes through the first exit on the bottom plate, the magnets 2 and the iron blocks 5 on the third light-shielding cloth 16 attract each other to make the first exit on the bottom plate restore the closed state.

An attraction force between the magnets 2 and the iron blocks 5 is smaller than a weight of the workpiece 23 to be detected. In this way, when the workpiece 23 to be detected falls, the magnets 2 and the iron blocks 5 on the third light-shielding cloth 16 at the first exit on the bottom plate are separated under the gravity of the workpiece 23 to be detected.

A first conveyor belt 21 and a second conveyor belt 11 parallel to each other are disposed in the light-shielding box 1, and the second conveyor belt 11 and the first conveyor belt 21 are respectively arranged left and right at an interval.

A lower end of the first conveyor belt 21 is wound on a first conveyor belt driving shaft 17, and an upper end of the first conveyor belt 21 is wound round a first conveyor belt driven shaft 22. A lower end of the second conveyor belt 11 is wound on a second conveyor belt driving shaft 12, and an upper end of the second conveyor belt 11 is wound on a second conveyor belt driven shaft 9.

Figure 2:
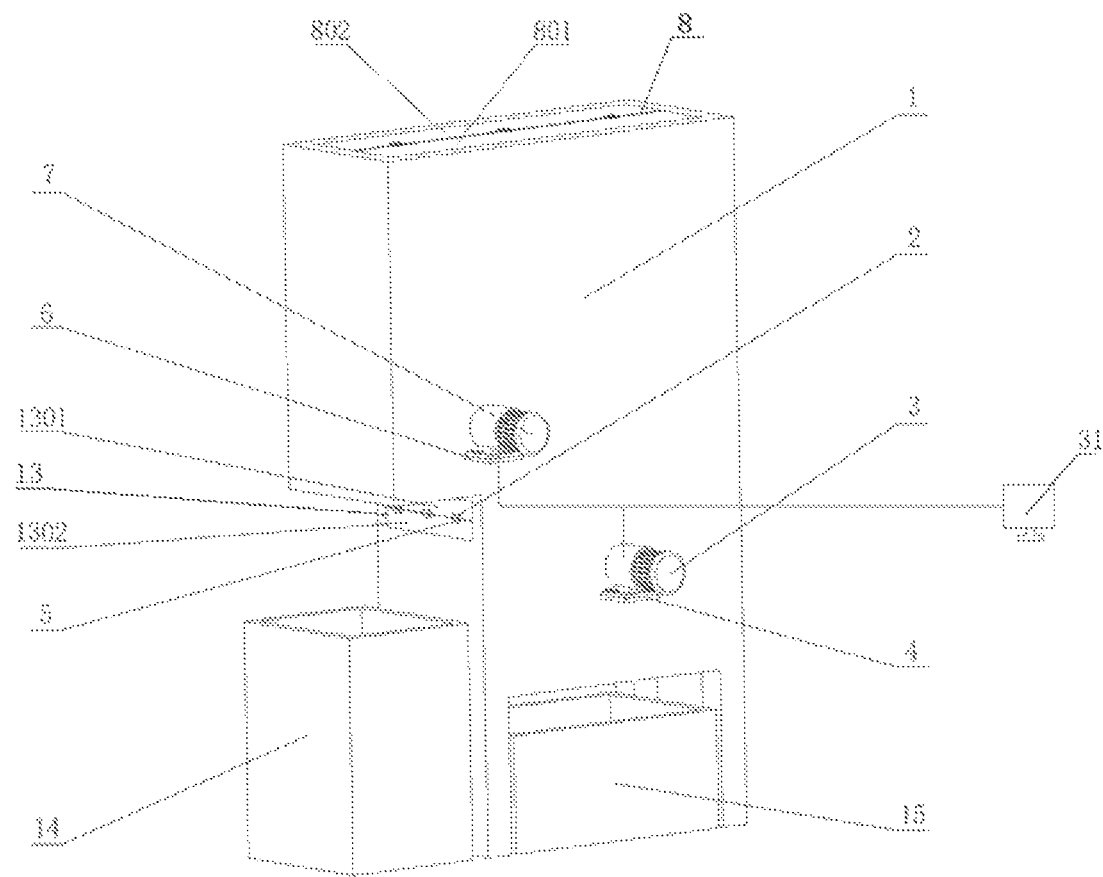
FIG. 2 is an axonometric view illustrating an outline structure of a rapid detection tool for a coaxial relationship based on a photosensitive material in the present invention.
Figure 3:
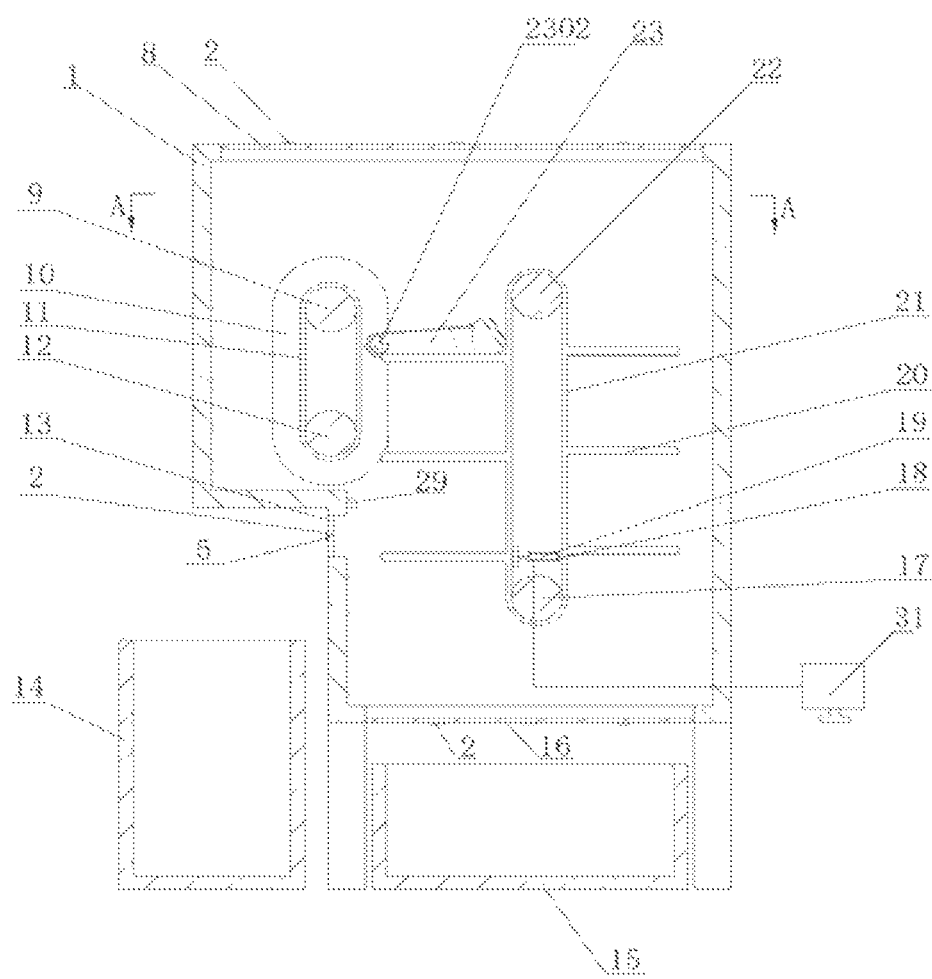
FIG. 3 is a front sectional view of FIG. 2.
Figure 4:
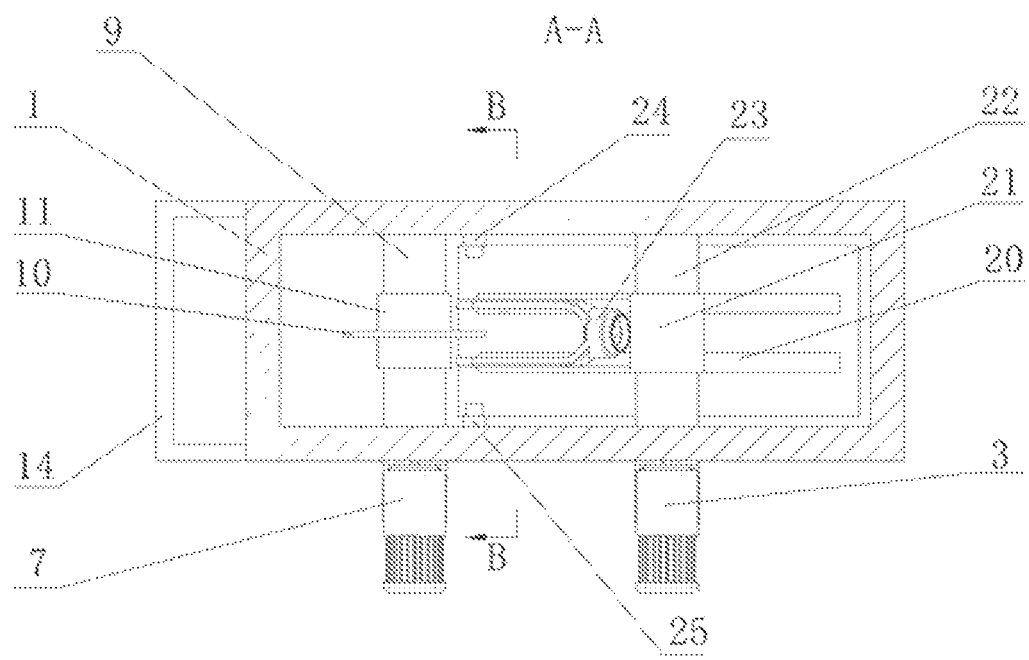
FIG. 4 is a schematic sectional view of FIG. 3 in A-A direction.
Figure 5:
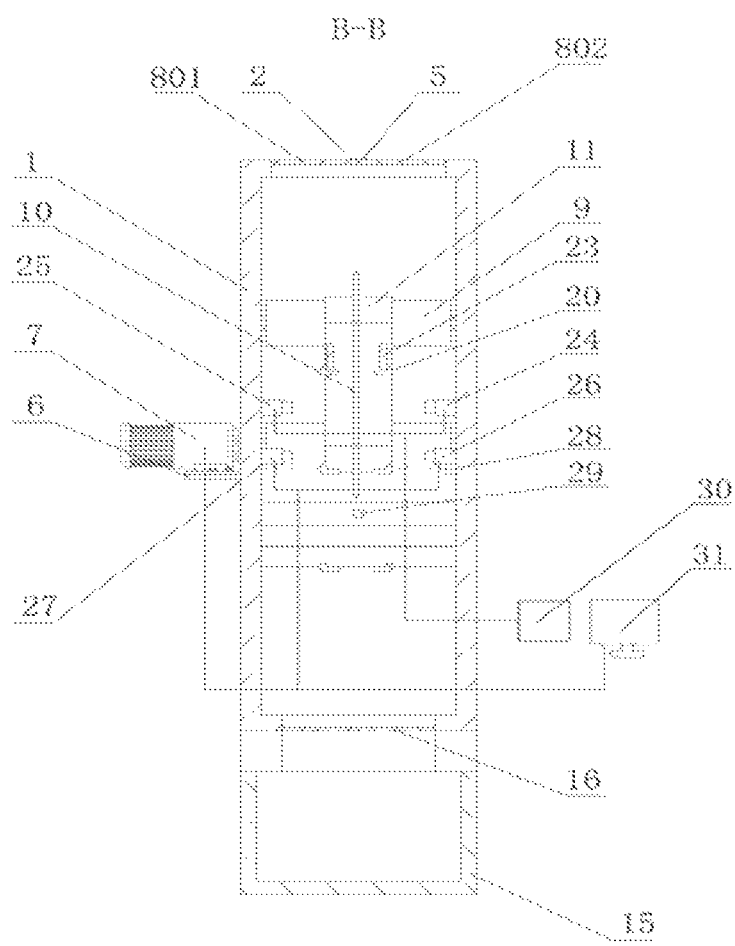
FIG. 5 is a schematic sectional view of FIG. 4 in B-B direction.

The four shafts including the first conveyor belt driving shaft 17, the first conveyor belt driven shaft 22, the second conveyor belt driving shaft 12, and the second conveyor belt driven shaft 9 are all horizontally arranged in a front-rear direction, and are all connected to a front side plate and a rear side plate of the light-shielding box 1 by means of bearings. One end of the first conveyor belt driving shaft 17 extends out of the side plate of the light-shielding box 1 and then is coaxially and fixedly connected to an output shaft of a first servo motor 3 horizontally arranged in the front-rear direction, one end of the second conveyor belt driving shaft 12 extends out of the side plate of the light-shielding box 1 and then is coaxially and fixedly connected to an output shaft of a second servo motor 7 horizontally arranged in the front-rear direction, the first servo motor 3 drives the first conveyor belt driving shaft 17 to rotate, and the second servo motor 7 drives the second conveyor belt driving shaft 12 to rotate. A motor housing of the first servo motor 3 is fixedly connected to an outer surface of the front side plate of the light-shielding box 1 by means of a first servo motor mounting plate 4, and a motor housing of the second servo motor 7 is fixedly connected to the outer surface of the front side plate of the light-shielding box 1 by means of a second servo motor mounting plate 6. FIG. 2 shows that a front end of the first conveyor belt driving shaft 17 and a front end of the second conveyor belt driving shaft 12 extend out of the front side plate of the light-shielding box 1 and then are fixedly connected to the first servo motor 3 and the second servo motor 7 respectively, and the first servo motor mounting plate 4 and the second servo motor mounting plate 6 are fixedly connected to the outer surface of the front side plate of the light-shielding box 1.

The first conveyor belt 21 and the second conveyor belt 11 have opposite moving directions, the first conveyor belt 21 drives the workpiece 23 to be detected to move from top to bottom, and the second conveyor belt 11 drives one side of a photosensitive plate 10 adjacent to the workpiece 23 to be detected to move upward.

A photosensitive plate 10 is fixedly and circumferentially connected right in the middle of an outer surface of the second conveyor belt 11 in the front-rear direction. The photosensitive plate 10 is a closed oval encircling the second conveyor belt 11, matches the outer surface of the second conveyor belt 11, is perpendicular to the outer surface of the second conveyor belt 11, and rotates synchronously with the second conveyor belt 11.

A plurality of support plates 20 are fixedly and circumferentially connected at equal intervals on an outer surface of the first conveyor belt 21, and each of the support plates 20 is perpendicular to the outer surface of the first conveyor belt 21. Each of the support plates 20 is in a U-shape, a bottom of the U-shape of each of the support plates 20 is fixedly connected to the first conveyor belt 21, each of the support plates 20 is used for supporting the workpiece 23 to be detected in the U-shape, the workpiece 23 to be detected is horizontally placed on a support plate 20 of the support plates 20, two side plates of the U-shape of each of the support plates 20 are arranged in the front-rear direction, and the two side plates exactly support the front side plate 2302 and the rear side plate 2301 of the workpiece 23 to be detected, that is, the front side plate 2302 and the rear side plate 2301 are located right above the two side plates of the U-shape of the support plate 20. The two sides of the U-shape of each of the support plates 20 are preferably made into an L shape so as to position the workpiece 23 to be detected. When facing toward the second conveyor belt 11 and the photosensitive plate 10, the support plate 20 is exactly in a horizontal state. At this time, an opening of the U-shape of each of the support plate 20 and the workpiece 23 to be detected faces toward the second conveyor belt 11 and the photosensitive plate 10. The photosensitive plate 10 extends rightward to a position right in the middle of the opening of the U-shape and covers the workpiece 23 to be detected in the front-rear direction, and the front axial hole 2304 and the rear axial hole 2303 have equal distances from the photosensitive plate 10 in the front-rear direction.

A thickness of the photosensitive plate 10 in the front-rear direction is far smaller than a front-rear distance of the opening of the U-shape of the workpiece 23 to be detected, and a width of the photosensitive plate 10 in the left-right direction is sufficient to cover the front axial hole 2304 and the rear axial hole 2303. A front surface and a rear surface of the photosensitive plate 10 are each coated with a photosensitive resin, so that a polymerization reaction immediately occurs under irradiation of a light source, while the photosensitive resin in the dark remains the same.

A left-right distance between the first conveyor belt 21 and the second conveyor belt 11 is larger than a left-right length of the workpiece 23 to be detected upon placement, so that the workpiece 23 to be detected and the second conveyor belt 11 do not interfere with each other.

A common through-hole is provided at the bottom of the U-shape of each support plate 20 and a connection part between the bottom of the U-shape of each support plate 20 and the first conveyor belt 21. An air cylinder 19 is disposed in the first conveyor belt 21 at the same height as the second exit on the left side plate of the light-shielding box 1. A cylinder body of the air cylinder 19 is fixed to an air cylinder mounting plate 18, the air cylinder mounting plate 18 is fixed to the rear side plate on the inner side of the light-shielding box 1, the air cylinder 19 is at the same height as the second exit on the left side plate of the light-shielding box 1, and an output rod of the air cylinder 19 faces toward the middle of the second exit on the left side plate of the light-shielding box 1. When the common through-hole on the support plate 20 and the first conveyor belt 21 moves to the same height as the output rod of the air cylinder 19, the output rod of the air cylinder 19 moves leftward, extends out of the common through-hole, and pushes the unqualified workpiece 23 to be detected on the support plate 20 toward the second exit on the left side plate of the light-shielding box 1 so as to reject the workpiece 23 to be detected having a coaxial relationship not meeting requirements. The output rod of the air cylinder 19 keeps a distance from an inner side surface of the first conveyor belt 21 in a contracted state, and does not affect the movement of the first conveyor belt 21.

A first light source 27 is arranged on the front side plate on the inner side of the light-shielding box 1, and a first camera 25 is disposed right above the first light source 27 at some distance. A second light source 26 is disposed on the rear side plate on the inner side of the light-shielding box 1 at a corresponding position at the same height right opposite the first light source 27. The position of the first light source 27 and the position of the second light source 26 correspond to the front axial hole 2304 and the rear axial hole 2303 of the workpiece 23 to be detected. A second camera 24 is disposed on the rear side plate on the inner side of the light-shielding box 1 at the same height right opposite the first camera 25. A first position sensor 28 is disposed at the same height as the first light source 27 and the second light source 26. A second position sensor 29 is disposed at the second exit on the left side plate of the light-shielding box 1.

A vertical distance between two vertically adjacent support plates 20 on the first conveyor belt 21 is larger than a distance between the first light source 27 and the first camera 25 or larger than a vertical distance between the second light source 26 and the second camera 24. When the two sides of the U-shape of the support plate 20 are L-shaped, the support plate 20 can position the workpiece 23 to be detected. Upper ends of the two sides should be lower in height than lowermost ends of the front axial hole 2304 and the rear axial hole 2303 of the workpiece 23 to be detected, thereby ensuring that the support plate 20 does not block light emitted by the first light source 27 from passing through the front axial hole 2304 of the workpiece 23 to be detected, and light emitted by the second light source 26 from passing through the rear axial hole 2303.

The vertical distance between the first light source 27 and the first camera 25 should be larger than a vertical height of the rear straight plate 2301 or the front straight plate 2302 of the workpiece 23 to be detected, and the second camera 24 and the second light source 26 are on the same line in the vertical direction. The vertical distance between the second light source 26 and the second camera 24 is equal to the vertical distance between the first light source 27 and the first camera 25. The first light source 27 and the second light source 26 are at the same height and symmetrical with respect to the photosensitive plate 10 in the front-rear direction, and the first camera 25 and the second camera 24 are at the same height and symmetrical with respect to the photosensitive plate 10 in the front-rear direction. The first light source 27 and the second light source 26 both emit linear light, and have a light-emitting region slightly larger than an area of the rear axial hole 2303 or the front axial hole 2304 of the workpiece 23 to be detected. The first light source 27 irradiates the front surface of the photosensitive plate 10 through the front axial hole 2304 from the front, the second light source 26 irradiates the rear surface of the photosensitive plate 10 through the rear axial hole 2303 from the rear, and two circular patterns are formed in regions irradiated by light on the front surface and the rear surface of the photosensitive plate 10.

The first camera 25 and the second camera 24 are each connected to an image processing unit 30 through a signal line, and an output end of the image processing unit 30 is connected to a control unit 31 through a signal line. The first servo motor 3, the second servo motor 7, the air cylinder 19, the first position sensor 28, the second position sensor 29, the first light source 27, and the second light source 26 are each connected to the control unit 31 through a corresponding signal line or control line. The image processing unit 30 and the control unit 31 are disposed outside the light-shielding box 1.

Referring to FIG. 1 to FIG. 5, during working of the rapid detection tool for the coaxial relationship based on the photosensitive material in the present invention, in an initial state, the output rod of the air cylinder 19 is in a contracted state, the first conveyor belt 21 and the second conveyor belt 11 are both in a stationary state, the corresponding magnets 2 and iron blocks 5 on the first light-shielding cloth 8, the second light-shielding cloth 13, and the third light-shielding cloth 16 are all in a mutually attracted state, and the first light-shielding cloth 8, the second light-shielding cloth 13, and the third light-shielding cloth 16 are all in a closed state.

The control unit 31 controls the first servo motor 3 and the second servo motor 7 to simultaneously start working. The first servo motor 3 drives the first conveyor belt driving shaft 17 to rotate and drives the first conveyor belt 21 to rotate around the first conveyor belt driving shaft 17 and the first conveyor belt driven shaft 22, the support plates 20 move with the first conveyor belt 21, the second servo motor 7 drives the second conveyor belt driving shaft 12 to rotate and drives the second conveyor belt 11 to rotate around the second conveyor belt driving shaft 12 and the second conveyor belt driven shaft 9, and the photosensitive plate 10 moves with the second conveyor belt 11 on the second conveyor belt 11, so that the first conveyor belt 21 and the second conveyor belt 11 have opposite moving directions.

The first light-shielding cloth 8 at the entrance is manually separated, so that the first light-shielding cloth 8 is in an open state. When the first conveyor belt 21 drives the support plate 20 close to the photosensitive plate 10 to move to the uppermost end and a horizontal state, the workpiece 23 to be detected is placed on the support plate 20 on the uppermost end, so that the front straight plate 2302 and the rear straight plate 2301 of the workpiece 23 to be detected contact the two side plates of the support plate 20 without gaps, the front axial hole 2304 and the rear axial hole 2303 are respectively located on the two side plates of the support plate 20, and the bottom of the U-shape of the workpiece 23 to be detected contacts the bottom of the U-shape of the support plate 20, so as to position the workpiece 23 to be detected. After the workpiece 23 to be detected is placed properly, the magnets 2 and the iron blocks 5 on the first light-shielding cloth 8 attract each other, so that the entrance on the top of the light-shielding box 1 restores the closed state.

The first conveyor belt 21 drives the workpiece 23 to be detected close to the side of the photosensitive plate 10 to move downward, and meanwhile, the photosensitive plate 10 moves upward on the side close to the workpiece 23 to be detected. When the front axial hole 2304 and the rear axial hole 2303 of the workpiece 23 to be detected are at the same height as the first light source 27 and the second light source 26, the first position sensor 28 is triggered. The first position sensor 28 detects the position of the workpiece 23 to be detected, and transmits a detected signal to the control unit 31, then the control unit 31 controls the first servo motor 3 and the second servo motor 7 to stop working, and accordingly, the first conveyor belt 21 and the second conveyor belt 11 both stop working, so that the workpiece 23 to be detected and the photosensitive plate 10 are in the stationary state.

Afterwards, the control unit 31 controls the first light source 27 and the second light source 26 to start emitting light, where the first light source 27 irradiates the front axial hole 2304 from a front side of the workpiece 23 to be detected, and the second light source 26 irradiates the rear axial hole 2303 from a rear side, so that light irradiates the front surface and the rear surface of the photosensitive plate 10 through the front axial hole 2304 and the rear axial hole 2303 of the fork from two sides respectively, the photosensitive resin coated on the front surface and the rear surface of the photosensitive plate 10 immediately produces a polymerization reaction under the irradiation of the light sources, while the photosensitive resin in the dark remains the same, and a circular pattern is formed separately on the front surface and the rear surface of the photosensitive plate 10.

The control unit 31 controls the first camera 25 and the second camera 24 to simultaneously start working, where the first camera 25 photographs the circular pattern on the front surface of the photosensitive plate 10, and the second camera 24 photographs the circular pattern on the rear surface of the photosensitive plate 10, and pattern information is sent to the image processing unit 30. The image processing unit 30 calculates coordinates of centers of the two circles, obtains a coaxial relationship between the rear axial hole 2303 and the front axial hole 2304, and judges whether the measured coaxial relationship meets tolerance requirements.

When the control unit 31 judges that the coaxial relationship does not meet the tolerance requirements, the control unit 31 controls the first servo motor 3 and the second servo motor 7 to simultaneously start working and drive the workpiece 23 to be detected to move downward and drive the photosensitive plate 10 to rotate. When the workpiece 23 to be detected is at the same height as the second exit on the left side plate of the light-shielding box 1, the second position sensor 29 is triggered. The second position sensor 29 detects the position of the workpiece 23 to be detected, and sends a signal to the control unit 31. The control unit 31 sends an instruction and controls the first servo motor 3 and the second servo motor 7 to stop working, so that the workpiece 23 to be detected and the photosensitive plate 10 are both in the stationary state. Afterwards, the control unit 31 controls the air cylinder 19 to start working, where the output rod of the air cylinder 19 passes leftward through the common through-hole on the support plate 20 and the first conveyor belt 21, and then push the workpiece 23 to be detected. The second light-shielding cloth 13 is separated under the push of the output rod of the air cylinder 19. The workpiece 23 to be detected is pushed out through the second exit on the left side plate of the light-shielding box 1, and falls into the defective product warehouse 14. After the workpiece 23 to be detected is pushed out, the magnets 2 and the iron blocks 5 on the second light-shielding cloth 13 attract each other, so that the second light-shielding cloth 13 closes the second exit on the left side plate of the light-shielding box 1.

On the contrary, when the control unit 31 judges that the coaxial relationship meets the tolerance requirements, the control unit 31 sends an instruction and controls the first servo motor 3 and the second servo motor 7 to simultaneously start working. The first servo motor 3 drives the first conveyor belt driving shaft 17 to rotate, and the support plate 20 rotates with the first conveyor belt 21 and drives the workpiece 23 to be detected to move downward. When the support plate 20 on which the workpiece 23 to be detected is placed rotates to a vertical state, the workpiece 23 to be detected having the coaxial relationship meeting the requirements makes the third light-shielding cloth 16 separated under the gravity of the workpiece 23 to be detected, and falls into the quality product warehouse 15 through the first exit on the bottom plate of the light-shielding box 1. After the workpiece 23 to be detected passes, the magnets 2 and the iron blocks 5 on the third light-shielding cloth 16 attract each other to make the first exit on the bottom plate of the light-shielding box 1 restore the closed state.

The second servo motor 7 continues to drive the second conveyor belt driving shaft 12 to rotate and drive the second conveyor belt 11 to rotate around the second conveyor belt driving shaft 12 and the second conveyor belt driven shaft 9. The photosensitive plate 10 moves with the second conveyor belt 11 on the second conveyor belt 11. The cycle repeats, and the next workpiece 23 to be detected is detected.

What is claimed is:

1. A rapid detection tool for a coaxial relationship based on a photosensitive material, wherein a top plate of a light-shielding box is provided with an entrance, a bottom plate of the light-shielding box is provided with a first exit, and a left side plate of the light-shielding box is provided with a second exit, a defective product warehouse is placed on a lower left side outside the light-shielding box, the defective product warehouse is placed right below the second exit on the left side plate, and a quality product warehouse is placed right below the first exit on the bottom plate, wherein a first conveyor belt and a second conveyor belt parallel to each other and respectively arranged left and right at an interval are disposed in the light-shielding box;

an output shaft of a first servo motor horizontally arranged in a front-rear direction is coaxially and fixedly connected to a first conveyor belt driving shaft, a lower end of the first conveyor belt is wound on the first conveyor belt driving shaft, and an upper end of the first conveyor belt is wound on a first conveyor belt driven shaft;

an output shaft of a second servo motor horizontally arranged in the front-rear direction is coaxially and fixedly connected to a second conveyor belt driving shaft, a lower end of the second conveyor belt is wound on the second conveyor belt driving shaft, and an upper end of the second conveyor belt is wound on a second conveyor belt driven shaft;

a photosensitive plate is fixedly and circumferentially connected right in a middle of an outer surface of the second conveyor belt, and the photosensitive plate is perpendicular to the outer surface of the second conveyor belt;

a plurality of support plates each in a U-shape for supporting a workpiece to be detected are fixedly and circumferentially connected at equal intervals on an outer surface of the first conveyor belt, two side plates of the U-shape are arranged in the front-rear direction, each of the support plates is perpendicular to the outer surface of the first conveyor belt, two axial holes of the workpiece to be detected are respectively located on the two side plates of the U-shape of each of the support plates, the photosensitive plate extends rightward to a position right in a middle of an opening of the U-shape and covers the two axial holes, and distances between the two axial holes and the photosensitive plate in the front-rear direction are equal;

a common through-hole is provided at a bottom of the U-shape of each of the support plates and a connection part between the bottom of the U-shape of each of the support plates and the first conveyor belt;

an air cylinder is disposed at an identical height as the second exit on the left side plate, and an output rod of the air cylinder is oriented toward the second exit on the left side plate;

a first light source is arranged on a front side plate inside the light-shielding box, first camera is disposed right above the first light source, the first light source and a second light source are disposed on a rear side plate inside the light-shielding box, the first light source and the second light source are symmetrical with respect to the photosensitive plate in the front-rear direction, and the first camera and the second camera are symmetrical with respect to the photosensitive plate in the front-rear direction;

a first position sensor is disposed at an identical height as the first light source and the second light source, and a second position sensor is disposed at the second exit on the left side plate; and the first camera and the second camera are each connected to an image processing unit through a first signal line, an output end of the image processing unit is connected to a control unit through a second signal line, and the first servo motor, the second servo motor, the air cylinder, the first position sensor, the second position sensor, the first light source, and the second light source are each connected to the control unit through a corresponding signal line or control line.

2. The rapid detection tool for the coaxial relationship based on the photosensitive material according to claim 1, wherein a light-shielding cloth is disposed at each of the entrance, the first exit, and the second exit of the light-shielding box, the light-shielding cloth is divided in a middle into a first piece and a second piece, wherein the first piece has magnets mounted thereon, the second piece has iron blocks mounted thereon, and the magnets and the iron blocks attract each other, so that the light-shielding cloth blocks light.

3. The rapid detection tool for the coaxial relationship based on the photosensitive material according to claim 2, wherein an attraction force between the magnets and the iron blocks is smaller than a weight of the workpiece to be detected.

4. The rapid detection tool for the coaxial relationship based on the photosensitive material according to claim 1, wherein a motor housing of the first servo motor is fixedly connected to an outer surface of the front side plate of the light-shielding box by a first servo motor mounting plate, and a motor housing of the second servo motor is fixedly connected to the outer surface of the front side plate of the light-shielding box by second servo motor mounting plate.

5. The rapid detection tool for the coaxial relationship based on the photosensitive material according to claim 1, wherein a thickness of the photosensitive plate in the front-rear direction is smaller than a front-rear opening distance of an opening of a U-shape of the workpiece to be detected, and a front surface and a rear surface of the photosensitive plate are each coated with a photosensitive resin.

6. The rapid detection tool for the coaxial relationship based on the photosensitive material according to claim 1, wherein a left-right distance between the first conveyor belt and the second conveyor belt is larger than a left-right length of the workpiece to be detected upon placement.

7. The rapid detection tool for the coaxial relationship based on the photosensitive material according to claim 1, wherein a vertical distance between vertically adjacent two of the support plates on the first conveyor belt is larger than a distance between the first light source and the first camera or larger than a vertical distance between the second light source and the second camera, and upper ends of two sides of the U-shape of each of the support plates are lower in height than lowermost ends of the two axial holes of the workpiece to be detected.

8. The rapid detection tool for the coaxial relationship based on the photosensitive material according to claim 1, wherein the two side plates of the U-shape of each of the support plates are L-shaped, and support a front side plate and a rear side plate of the workpiece to be detected, respectively, and the front side plate and the rear side plate of the workpiece to be detected are provided with the two axial holes, respectively.

9. A detection method using the rapid detection tool for the coaxial relationship based on the photosensitive material according to claim 1, comprising the following steps:

step A: controlling, by the control unit, the first servo motor and the second servo motor to simultaneously work, so that the first conveyor belt and the second conveyor belt have opposite moving directions, the support plates move with the first conveyor belt, and the photosensitive plate moves with the second conveyor belt;

step B: placing, from the entrance, the workpiece to be detected on a support plate of the support plates on an uppermost end, and driving, by the first conveyor belt, the workpiece to be detected close to a side of the photosensitive plate to move downward, and when the first position sensor detects that the two axial holes of the workpiece to be detected are at an identical height as the first light source and the second light source, controlling, by the control unit, the first servo motor and the second servo motor to stop working;

step C: controlling, by the control unit, the first light source to irradiate a front axial hole of the two axial holes from a front side of the workpiece to be detected, and the second light source to irradiate a rear axial hole of the two axial holes from a rear side of the workpiece to be detected, so as to form a first circular pattern on a front surface of the photosensitive plate and a second circular pattern on a rear surface of the photosensitive plate;

step D: controlling, by the control unit, the first camera to photograph the first circular pattern on the front surface of the photosensitive plate, and the second camera to photograph the second circular pattern on the rear surface of the photosensitive plate, and calculating, by the image processing unit, coordinates of centers of the first circular pattern and the second circular pattern, and judging whether a coaxial relationship between the first circular pattern and the second circular pattern meets tolerance requirements; and step E: controlling, by the control unit, the first servo motor and the second servo motor to work again, when the control unit judges that the coaxial relationship does not meet the tolerance requirements, and the second position sensor detects that the workpiece to be detected moves to an identical height as the second exit on the left side plate of the light-shielding box, the first servo motor and the second servo motor stopping working, and controlling, by the control unit, the output rod of the air cylinder to pass leftward through the common through-hole and then push the workpiece to be detected into the defective product warehouse; or when the coaxial relationship meets the tolerance requirements, and the support plate on which the workpiece to be detected is placed rotates to a vertical state, the workpiece to be detected falling from the first exit on the bottom plate into the quality product warehouse under gravity.

* * * * *